(12) United States Patent
Koumaras

(10) Patent No.: US 12,158,337 B2
(45) Date of Patent: Dec. 3, 2024

(54) APPARATUS AND SYSTEM FOR MEASURING DIMENSIONS OF FREIGHT ITEMS

(71) Applicant: LEOPARD SYSTEMS PTY LTD, St Kilda (AU)

(72) Inventor: Alexios Koumaras, St Kilda (AU)

(73) Assignee: LEOPARD SYSTEMS PTY LTD, St Kilda (AU)

( * ) Notice: Subject to any disclaimer, the term of this patent is extended or adjusted under 35 U.S.C. 154(b) by 427 days.

(21) Appl. No.: 17/754,207

(22) PCT Filed: Aug. 14, 2020

(86) PCT No.: PCT/AU2020/050853
§ 371 (c)(1),
(2) Date: Mar. 25, 2022

(87) PCT Pub. No.: WO2021/056049
PCT Pub. Date: Apr. 1, 2021

(65) Prior Publication Data
US 2022/0325999 A1    Oct. 13, 2022

(30) Foreign Application Priority Data

Sep. 26, 2019 (AU) .............................. 2019903608

(51) Int. Cl.
*G01B 3/10* (2020.01)
*G01B 3/00* (2006.01)
(Continued)

(52) U.S. Cl.
CPC .............. *G01B 3/004* (2013.01); *G01B 3/04* (2013.01); *G01B 3/1041* (2013.01);
(Continued)

(58) Field of Classification Search
CPC .... G01B 3/004; G01B 3/1069; G01B 3/1041; G01B 3/1094
(Continued)

(56) References Cited

U.S. PATENT DOCUMENTS 5,012,590 A * 5/1991 Wagner ............... E04G 21/1891
33/759
5,433,014 A * 7/1995 Falk ....................... G01D 5/347
455/67.11
(Continued)

FOREIGN PATENT DOCUMENTS

CN         201628523 U    11/2010
CN         107305115 A    10/2017
(Continued)

OTHER PUBLICATIONS

Extended European Search Report from corresponding EP Application No. 20868727.7 mailed Oct. 14, 2022.

*Primary Examiner* — George B Bennett
(74) *Attorney, Agent, or Firm* — Vorys, Sater, Seymour and Pease LLP

(57) ABSTRACT

An apparatus for measuring a dimension of a freight item. The apparatus includes an elongate gauge member having a sequence of machine-readable codes visible along its length. Each of the machine-readable codes represents a length value corresponding to a position along the gauge member. The apparatus also includes a marker device, movable along the gauge member, for designating a selected position. The marker device includes a machine-readable reference symbol on an external surface thereof, with the reference symbol being located on the marker device such that in use the reference symbol on the marker device and a subset of the machine-readable codes on the gauge member are simultaneously visible. In a preferred embodiment the elongate gauge member includes a coilable tape and the marker (Continued)

device includes a housing within which the coilable tape is enclosed. A system including the measuring apparatus together with a mobile computing device is also disclosed.

20 Claims, 9 Drawing Sheets

(51) Int. Cl.
*G01B 3/04* (2006.01)
*G01B 3/1041* (2020.01)
*G01B 3/1069* (2020.01)
*G01B 5/00* (2006.01)
*G06K 7/14* (2006.01)
*G06K 19/06* (2006.01)

(52) U.S. Cl.
CPC ......... *G01B 3/1069* (2020.01); *G01B 5/0021* (2013.01); *G06K 7/1413* (2013.01); *G06K 7/1417* (2013.01); *G06K 19/06028* (2013.01); *G06K 19/06037* (2013.01)

(58) Field of Classification Search
USPC .............. 33/494, 679.1, 706, 759, 760
See application file for complete search history.

(56) References Cited

U.S. PATENT DOCUMENTS

| | | | | |
|---|---|---|---|---|
| 5,553,390 A * | 9/1996 | Ernst | ............... | B61L 25/025 33/706 |
| 5,894,678 A * | 4/1999 | Masreliez | ............... | G01B 7/026 33/762 |
| 5,983,514 A * | 11/1999 | Lindsey | ............... | G01B 3/1061 33/760 |
| 6,898,865 B2 * | 5/2005 | Rodi | ............... | G01B 7/003 33/708 |
| 7,571,552 B2 * | 8/2009 | McAdam | ............... | G01D 5/2451 341/51 |
| 7,644,505 B2 * | 1/2010 | Zeng | ............... | G01C 15/06 33/707 |
| 7,774,948 B1 * | 8/2010 | Bareis | ............... | B43L 7/00 33/483 |
| 9,306,623 B2 * | 4/2016 | De Coi | ............... | B66B 13/22 |
| 11,279,603 B2 * | 3/2022 | Campbell | ............... | G01B 3/1061 |
| 11,359,902 B2 * | 6/2022 | Eun | ............... | G01B 21/045 |
| 2002/0148134 A1 * | 10/2002 | Meyer | ............... | G01B 3/1004 33/759 |
| 2008/0168674 A1 | 7/2008 | Nielson | | |
| 2011/0173832 A1 * | 7/2011 | Gribble | ............... | G01D 5/2495 33/701 |
| 2014/0250708 A1 * | 9/2014 | Bauer | ............... | G01B 3/1061 33/760 |
| 2015/0168119 A1 * | 6/2015 | French | ............... | G01B 3/1003 33/494 |
| 2017/0322006 A1 * | 11/2017 | Stewart | ............... | G01B 3/1084 |
| 2019/0257633 A1 * | 8/2019 | Levisohn | ............... | G01D 5/34746 |

FOREIGN PATENT DOCUMENTS

| | | |
|---|---|---|
| CN | 109657667 A | 4/2019 |
| GB | 2 102 121 A | 1/1983 |
| GB | 2 304 194 A | 3/1997 |
| JP | H08336510 A | 12/1996 |
| JP | 2007140775 A | 6/2007 |

* cited by examiner

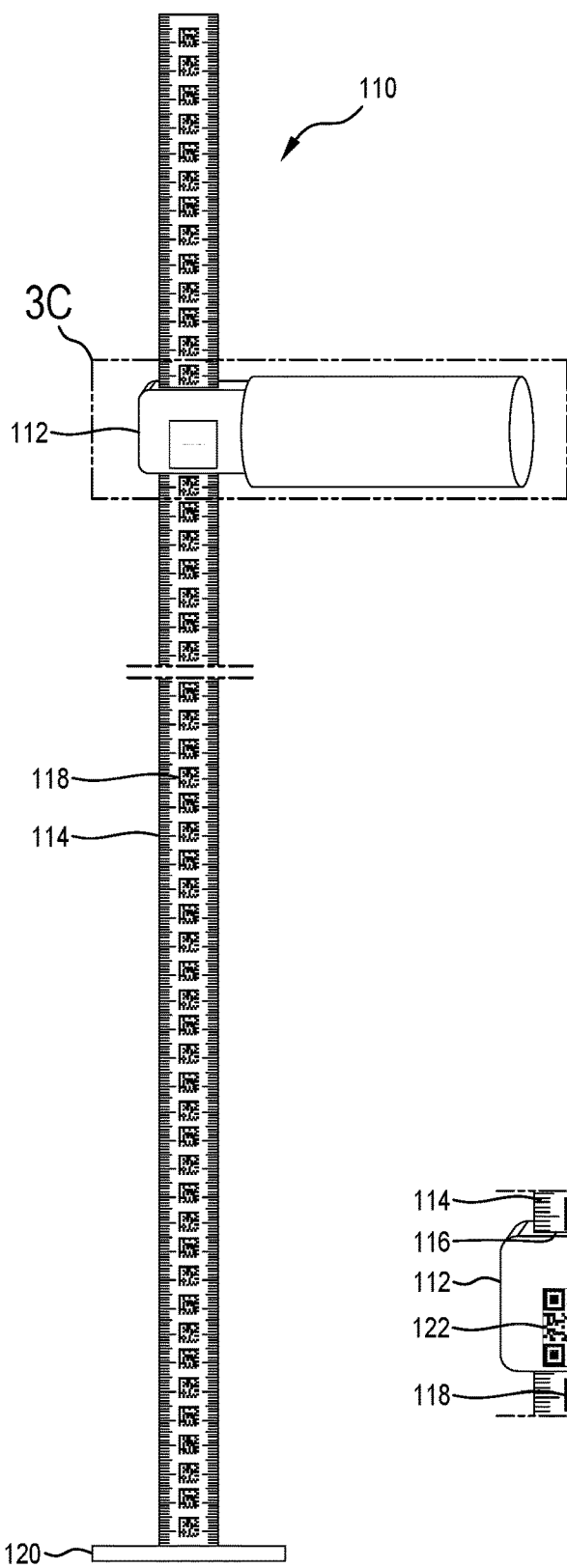
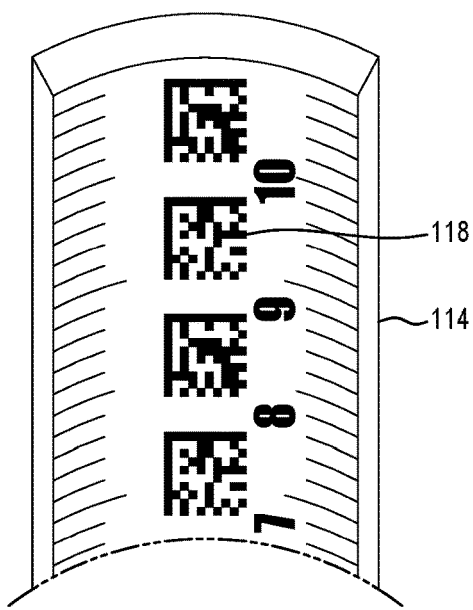
*Figure 3B*
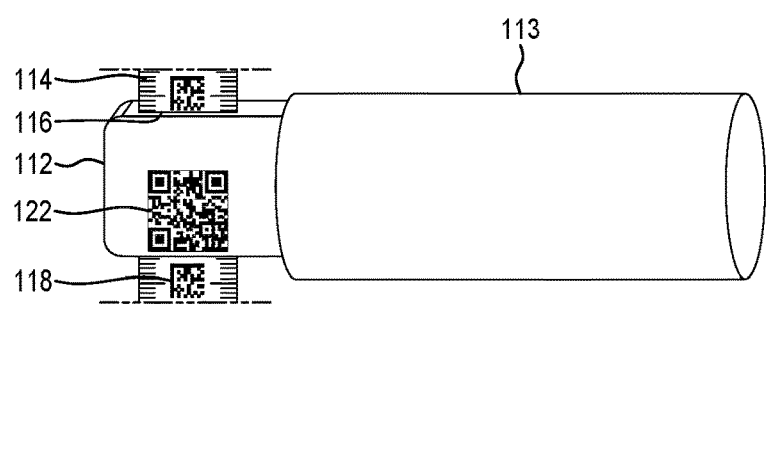
*Figure 3A*  *Figure 3C*

APPARATUS AND SYSTEM FOR MEASURING DIMENSIONS OF FREIGHT ITEMS

FIELD OF THE INVENTION

The present invention relates generally to apparatus and systems for measuring dimensions. In particular, the apparatus and system of the invention are useful for measuring the length, width and height of a freight item such as a package, carton or pallet. It will therefore be convenient to describe the invention in relation to that example application. However, it should be understood that the invention is capable of broader application and use.

BACKGROUND TO THE INVENTION

A common form of apparatus used for measuring dimensions, such as the length of an object, is a tape measure having a flexible ruler in the form of a coiled metal tape within a housing. This type of tape measure typically has human-readable roman numerals, printed on its upper surface, representing a length dimension in metric (e.g. centimeters) and/or imperial units (inches) relative to an end stop. Such a tape measure can be read directly by a user.

However, in some instances, such as in freight and logistics, a user must make and record many readings per hour. The speed of measurement thus becomes an important factor to the overall efficiency and cost of operating a freight transport company.

In commercial freight transport (including courier and postal services), "dimensional weight" (also known as "volumetric weight") is a pricing technique which uses an estimated weight that is calculated from the length, width and height of a package. Accurately and quickly capturing this volumetric data is therefore essential for postal, transport and logistics enterprises. However, the process involved in capturing this volumetric data has in the past been laborious, slow and costly, especially in circumstances where each measurement must be recorded in sequence by visual inspection using a manual mechanical tape measure of the type described above.

Some postal services use cubing machines involving fixed camera or 3D scanner installations to electronically scan/image packages as they pass an inspection point along a conveyor system. The volumetric data is determined from photographic or other images captured at the inspection point. Some examples of such fixed installations are sold under the brand Cubiscan™. While such fixed installations address the issue for large postal services, many other transport and logistics companies require more portable handheld apparatus which can quickly and accurately calculate the necessary volumetric data for each package.

One prior art apparatus addressing this problem is sold under the name Cubetape™ and is disclosed in US patent publication number US 2019/0257633. This patent discloses a device for measuring the length of an object. The device comprises a coilable tape having a plurality of machine-readable measurement codes on one surface thereof, with each of the machine-readable measurement codes encoding for a length. The device also includes a scan engine having a defined reading zone through which the coilable tape can be extended. The scan engine is configured to detect a machine-readable measurement code positioned within the reading zone, and a microprocessor uses the scanned code to determine and output a corresponding length value to an output means, such as a human-readable visual display or electronic transmission to a remote device. For the sake of brevity, the whole of specification for US patent publication number US 2019/0257633 is incorporated into this disclosure by cross-reference.

While this prior device goes some way towards addressing the problems encountered by freight companies, the device is complex, expensive and requires regular charging and periodic maintenance.

The prior art solutions may generally be characterized as:
Manual recording mechanisms such as pen & paper
Large, costly, fixed and mobile cubing machines such as Cubiscan™.
Costly single purpose cubing tape measures such as Cubetape™.

The advantages and disadvantages of each of these prior art solutions may be summarized as follows:
Manual Recording of Measurement
   Advantages
      Almost zero cost of solution
   Disadvantages
      High manual labour involvement
      Inefficient and not scalable
      Prone to user error
      Loss of data with misplacement of records
Dedicated Conveyor, Fixed or Table Measuring Machines
   Advantages
      Automated, semi-automated large volume measuring
   Disadvantages
      Fixed to limited mobility of position
      Costly to procure
      Costly to setup
      Costly to run
Hand-Held Combination Cubing Devices
   Advantages
      More cost effective than dedicated machines
      Mobile
   Disadvantages
      All in one single purpose device and limited use
      Single vendor proprietary solution
      Costly to procure
      Costly to maintain
      Unreliable and prone to wear and tear
      Potential for data loss Overall, the problems with these prior art solutions may be summarized as follows:
- Available electronic measurement apparatus are expensive and in some cases uneconomical to acquire. They are electronic in nature, requiring ongoing charging, are prone to malfunction, wear and tear, and prone to data loss and problematic in nature if lost, stolen, broken or not charged.
- Existing solutions are single purpose, potentially not mobile and fixed position.
- Existing solutions are difficult to update logic in a distributed deployment and limited ability to add features and updates as requirements evolve.
- Existing solutions have limitations in size of measurements to be captured.
- Manual data capture such as hand written, are inefficient, prone to error and misreading and loss of data.

Accordingly, there remains a need for portable handheld apparatus and/or systems which are easy to use, reliable, cost-effective and can be deployed broadly and quickly. An objective of the present invention is to address one or more of these needs

SUMMARY OF THE INVENTION

The present invention is based on a recognition that most transport and logistics workers already carry a mobile computing device (e.g. for in-depot operations or driver proof of delivery) and it is possible to make use of the image capture/processing capabilities of such a device, in combination with a measuring apparatus such as a modified mechanical tape measure (in a preferred embodiment), to provide length measurements and volumetric data which are essential to transport and logistics businesses.

One aspect of the present invention accordingly provides an apparatus for measuring a dimension of a freight item. The apparatus comprises an elongate gauge member having a sequence of machine-readable codes visible along its length. Each of the machine-readable codes represents a length value corresponding to a position along the gauge member relative to a reference position. The apparatus also comprises a marker device, movable along the gauge member, for designating a selected position. The marker device comprises a machine-readable reference symbol on an external surface thereof, with the reference symbol being located on the marker device such that in use the reference symbol on the marker device and a subset of the machine-readable codes on the gauge member are simultaneously visible.

In a preferred embodiment the elongate gauge member comprises a coilable tape and the marker device comprises a housing within which the coilable tape is enclosed. In this embodiment, the housing comprises a slot through which the tape exits the housing and the machine-readable reference symbol is located adjacent the slot such that, when the tape is extended from the housing through the slot, the reference symbol on the housing and the subset of the machine-readable codes on the tape are simultaneously visible.

A preferred embodiment of the invention thus adopts a physical structure similar in appearance to a conventional tape measure comprising a coilable tape enclosed within a housing.

In one embodiment, the reference symbol is located adjacent the slot such that, in use, the reference symbol is positioned immediate adjacent a code on the tape having the greatest length value of the sequence of visible codes.

In an alternative embodiment, the elongate gauge member comprises a rigid ruler and the marker device comprises a pointer which is attached to and slidable along the length of the ruler. In this embodiment the pointer may be configured to enable gripping by a hand of a user and thereby facilitate sliding of the pointer along the ruler. The machine-readable reference symbol is located on the pointer such that the reference symbol and the subset of the machine-readable codes on the ruler are simultaneously visible.

In another alternative embodiment, the elongate gauge member comprises a rigid ruler and the marker device comprises a glove configured to be worn on a hand of a user. In this embodiment, the machine-readable reference symbol is located on a finger, preferably a thumb, of the glove such that the reference symbol and the subset of the machine-readable codes on the ruler are simultaneously visible when the user grasps the ruler using their gloved hand.

In one embodiment, each machine-readable code comprises a barcode. Preferably, each machine-readable barcode is a two-dimensional (2D) Data Matrix barcode. However, in other embodiments, other forms of machine-readable code, such as a one-dimensional linear barcode, could instead be used.

In one embodiment, the reference symbol comprises a QR code. However, once again, any other unique symbol could be used. An advantage of using a QR code is that the code can be used to identify the URL of a website containing instructions on how to use the device together with the applicable system, or a link to promotional information about the device and associated system.

In one embodiment, the reference symbol is located adjacent the slot such that, in use, it is positioned immediately adjacent a code on the tape having the greatest length value of the sequence of visible codes.

Another aspect of the present invention provides a system for measuring dimensions of a freight item comprising a measuring apparatus of the type described above together with a mobile computing device comprising a processor, a camera (integrated into the device or separate) and a non-transitory, processor-readable storage medium. The non-transitory, processor-readable storage medium comprises programming instructions that, when executed, cause the processor to implement a method comprising steps of:

capturing an image of the measuring apparatus, when the camera is pointed by a user at the measuring apparatus, including within the image the machine-readable reference symbol together with a visible subset of the sequence of machine-readable codes;

identifying within the image the reference symbol;

identifying within the image each of the codes within the visible subset;

decoding each of the codes within the visible subset to determine a corresponding length value for each code;

determining the highest length value of the visible subset of codes; and outputting the highest length value as a measure of a dimension of the freight item.

In one embodiment the camera may be physically separate from but functionally connected to the mobile computing device. In one preferred form, the camera may be connected to the mobile computing device using a wireless communication protocol, such as Bluetooth™. A wired connection could be used but wireless has been found to be more convenient. In one particular form, the camera may be a Bluetooth ring scanner, such as model RS5100 available from Zebra Technologies Corp.

In one embodiment, the mobile computing device comprises a visual display screen and the outputting step may include displaying the dimension on the visual display screen.

In another embodiment, the mobile computing device comprises a loudspeaker and the outputting step may include announcing the dimension via the loudspeaker.

In a further embodiment, the mobile computing device comprises a transmitter and the outputting step may include transmitting the dimension to a remote server. This could be a specific server or could be part of a cloud service.

In a further embodiment, the programming instructions within the mobile computing device may cause the processor to implement further steps comprising:

capturing at least three images, one for each of the length, width and height of the freight item;

for each image, repeating the identifying, decoding, determining and outputting steps;

calculating a volume of the freight item; and outputting the calculated volume.

In a further embodiment, the programming instructions may cause the processor to implement preliminary steps comprising:

capturing an image of an identifier associated with the freight item; and recording the identifier for output together with the determined dimension(s) and/or volume of the freight item.

In a further embodiment, the programming instructions may cause the processor to implement further steps comprising:

capturing at least one additional image of the external appearance of the freight item; and recording the additional image(s) for output together with the identifier and the determined dimension(s) and/or volume of the freight item.

In a further embodiment, the programming instructions may allow for several images to be taken and be associated with the identifier of the freight item.

From the forgoing it will be appreciated that the problems of the prior art have been solved by preferred embodiments of the invention in the following ways:

A non-electronic measuring apparatus, such as tape measure, with both human readable and machine readable codes provides a low cost consumable item that is both reliable in performance and longevity.

Utilising either a rugged mobile computing device or a smartphone with an imager/camera, the software operating on the device is able to image the tape measure, or alternative measuring apparatus having an elongate gauge member and marker device, to determine the current length extended.

The mobile computing device and associated software performs the logic for data acquisition and transmission to a backend cloud system in real time wireless means, spanning Ethernet, Wi-Fi and cellular communications. This can encompass multiple item identification codes, multiple measurements, other ancillary data entry values, pictures, date/time stamps, calculated fields and other meta data.

The software may be updatable in real time by backend systems.

Advantages of preferred embodiments of the apparatus and associated system include:

Using an industry standard rugged mobile device or smartphone with an imager/camera sensor running suitable software making it portable, upgradeable and extensible.

Dual-purpose measuring tape measure or measuring apparatus, non electronic, no charging required, encoded with both machine readable barcodes and traditional markings. Typically, all operators would have a measuring apparatus on their person.

Possible cloud-based software solution to record and facilitate sharing of recorded information.

Lower cost and greater reliability with little to no maintenance and disposable once failed.

Measuring apparatus and mobile computing devices are not paired and are interchangeable freely.

Preferred embodiments of the invention are described below with reference to the accompanying drawings. These embodiments are given by way of illustration only. Other embodiments of the invention are possible, and consequently, the particularity of the accompanying drawings is not to be understood as superseding the generality of the preceding description of the invention.

BRIEF DESCRIPTION OF THE DRAWINGS

FIGS. 3A-3C show an overall front view and two detail views of an alternative measuring apparatus, comprising an elongate gauge member in the form of a rigid ruler, and a marker device in the form of a pointer with a handle, in accordance with another embodiment of the invention.

DESCRIPTION OF PREFERRED EMBODIMENTS

Figure 1:
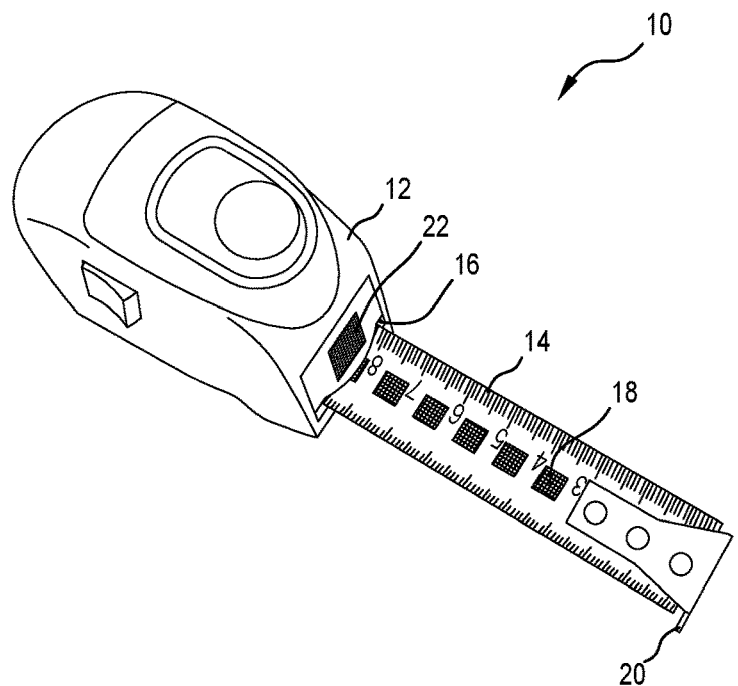
FIGS. 1 and 2 show side and a front perspective views, respectively, of a measuring apparatus, in accordance with a preferred embodiment of the invention, comprising an elongate gauge member in the form of a coilable tape, and a marker device in the form of a housing within which the coilable tape is enclosed.
Figure 2:
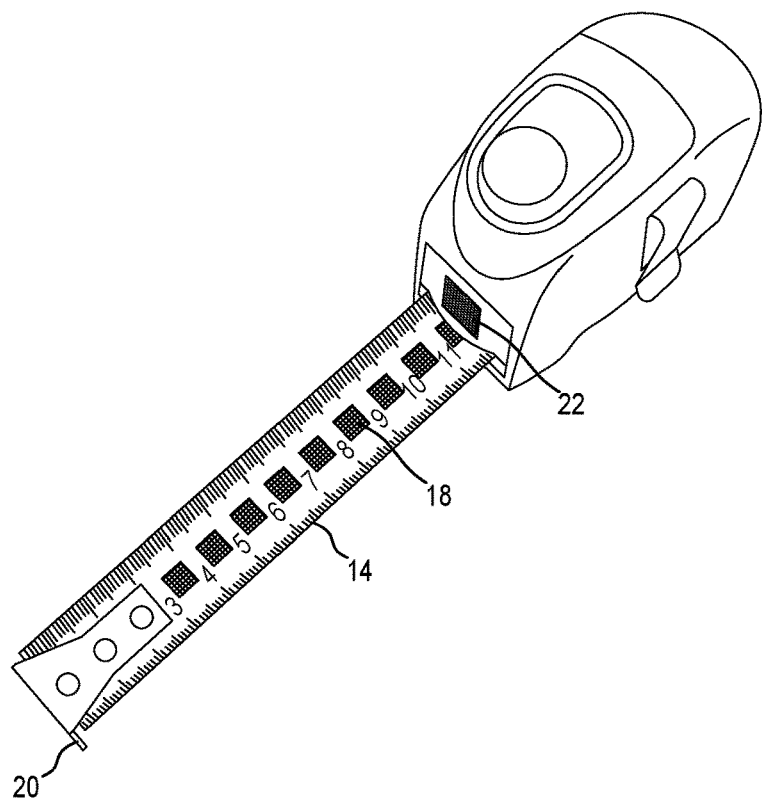

Referring initially to FIGS. 1 and 2 of the accompanying drawings, there is shown a measuring apparatus in accordance with a preferred embodiment of the invention. This apparatus is a modified version of a standard mechanical tape measure of the type conventionally used to measure the length of an object. It is simple and rugged in construction and intuitive to use.

The measuring apparatus 10 comprises an elongate gauge member in the form of a coilable tape 14 and a marker device in the form of a housing 12 within which the coilable tape is enclosed. The coilable tape 14 is preferably of the type made of spring steel or similar flexible but resilient material. The tape 14 exits the housing 12 through a slot 16 located on a forward face of the housing 12. The upper surface of the tape 14 has a sequence of machine-readable codes 18 printed thereon and, in the embodiment shown, each of the machine-readable codes is a two-dimensional Data Matrix barcode. Other forms of machine-readable code could however be used. Each of the Data Matrix barcodes 18 represents a length value corresponding to a position along the length of the tape 14 relative to a reference position, namely an end stop 20 of the tape 14.

The housing also has a machine-readable reference symbol 22 located on the forward face of the housing 12, just above the slot 16. In the embodiment shown, the reference symbol is a QR code. However, any other form of unique machine-readable symbol or code may be used. All that is necessary is that the machine-readable symbol 22 be uniquely identifiable, and distinguishable from the codes 18 which indicate length value measurements along the length of the tape 14.

The measuring apparatus 10 also encompasses an auto lock feature to simplify locking of the measurement once the tape 14 has been extended.

FIGS. 3A-3C show another measuring apparatus 110 in accordance with an alternative embodiment of the invention. In this embodiment the apparatus 110 comprises an elongate gauge member in the form of a rigid ruler 114 (being in the nature of a rod or stick), and a marker device in the form of a pointer 112.

In one possible embodiment, the ruler 112 may be about 150 cm to 180 cm in length, for convenient use with palletized freight. Freight pallets typically have base dimensions of 120×120 cm and may be stacked 120-150 cm high, so a ruler length of about 150 to 180 cm has been found convenient. Similar to the apparatus 10 shown in FIGS. 1-2, the upper surface of the ruler 114 has a sequence of machine-readable barcodes 118 printed thereon. Each of the barcodes 118 represents a length value corresponding to a position along the length of the ruler 114 relative to a reference position, namely an end-stop or foot 120.

The pointer 112 of the marker of device may be provided with a handle 113, represented merely as a cylinder in the drawing but preferably contoured for comfort, to enable easy gripping by a hand of a user. The handle 113 thereby facilitates sliding of the pointer 112 along the length of the ruler 114. For this purpose, the pointer 112 includes a slot, or aperture, 116 through which the ruler 114 passes. Any suitable mechanism, as would be apparent to a person skilled in the art, may be provided to facilitate sliding of the pointer 112 along the length of the ruler 114.

FIG. 3B is a detail view of a portion of the rigid ruler 114 showing its cross-sectional profile. In this embodiment the ruler is shown to be of uniform thickness and having a curved or arcuate shape to increase it rigidity. Other cross-sectional profiles may instead be used, the aim being to provide a lightweight and stiff ruler.

FIG. 3C shows a detail view of the marker device including the pointer 112 and handle 113. Similar to the measuring apparatus shown in FIGS. 1-2, the pointer 112 has a machine-readable reference symbol 122 located on the forward face of the pointer 112. Again, the reference symbol is a QR code, however any other form of unique machine-readable symbol or code could be used. It can be seen in FIG. 3C that the reference symbol QR code 122 is distinguishable from the sequence of barcodes 118 appearing on the ruler. It can also be seen that the QR code 122 is positioned towards the lower end of the housing forming the pointer 112, so as to be positioned immediately adjacent to the barcode 118 having the highest length value visible on the ruler 114.

Figure 3D:
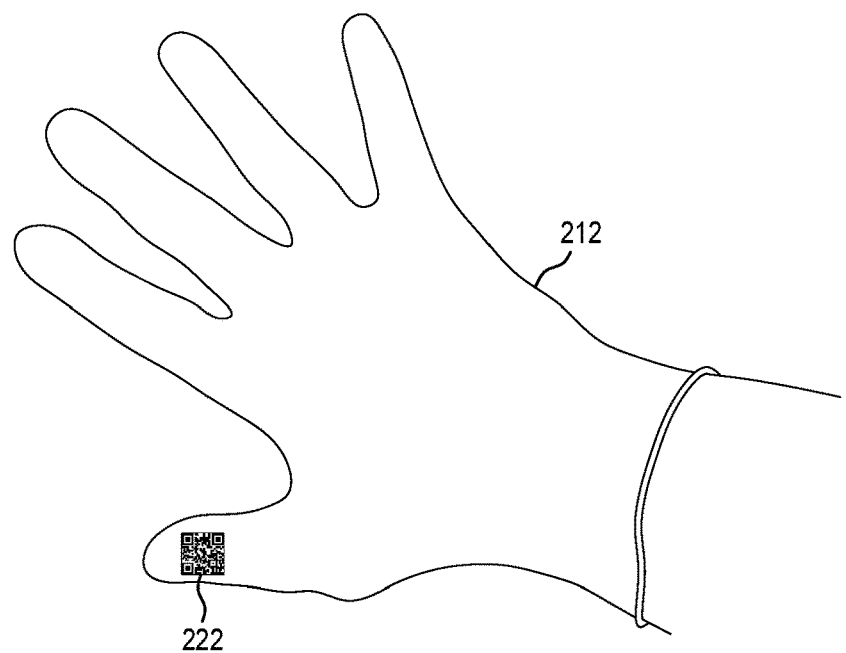
FIG. 3D shows a variation of the embodiment shown in FIGS. 3A-3C wherein the marker device is in the form of a glove to be worn on a hand of the user, and is intended to be used together with the rigid ruler shown in FIG. 3A instead of the pointer/handle shown in that Figure.

FIG. 3D shows a variation of the embodiment shown in FIGS. 3A-3C. In this embodiment the marker device comprises a glove 212 intended to be worn on a hand of the user. Left and right-handed versions may be provided, according to the user's requirement. In either case, the glove 212 features a reference symbol QR code 222 positioned on the thumb of the glove, preferably at a location where the user's thumbnail would be located. In this way, a user can grasp of the ruler 114 (shown in FIG. 3A) with their gloved hand, having their thumb positioned over the front face of the ruler 114 so that the QR code 222 is positioned in line with the barcodes 118. The user would then grasp the ruler 114 such that an upper portion of the ruler 114 is obscured by the user's hand and the QR code 222 is positioned immediately adjacent a barcode 118 having the highest length value visible on the lower portion of the ruler 114.

Figure 4:
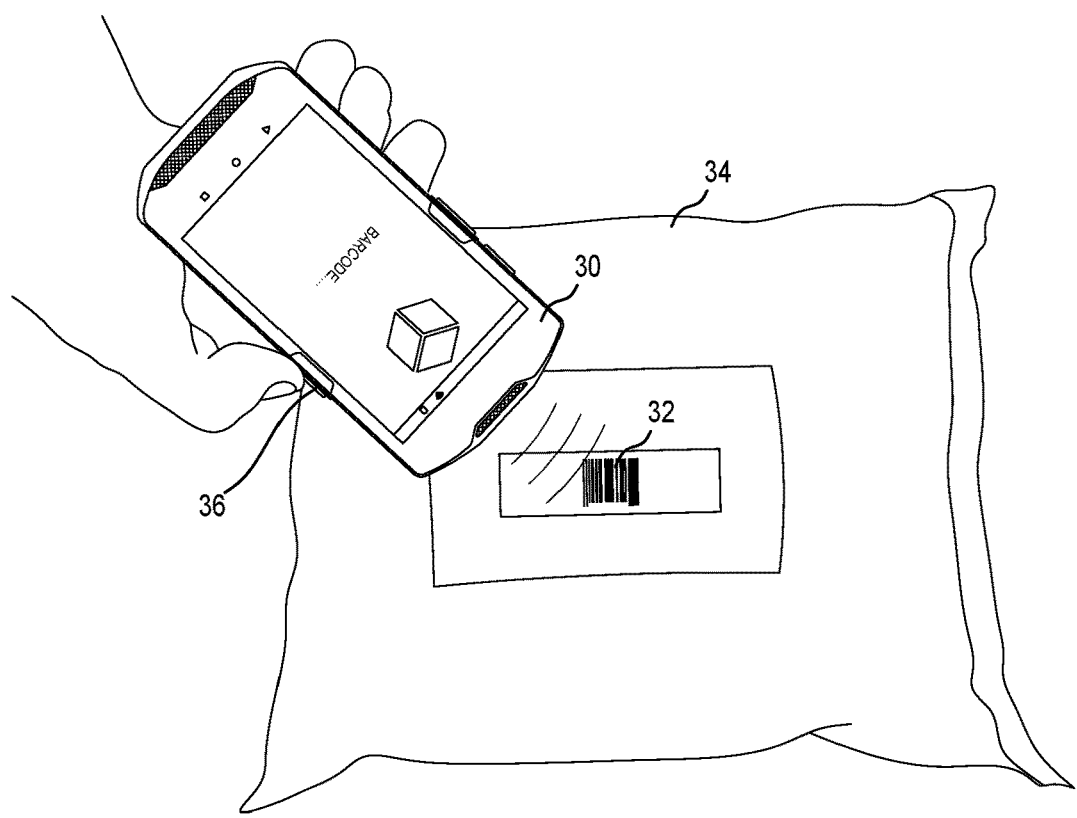
FIG. 4 shows a mobile computing device being used to capture an image of an identifier attached to a freight item, in this instance the freight item being a satchel.

FIG. 4 shows a mobile computing device 30 being used to capture an image of an identifier 32 attached to a freight item 34. In the example shown, the freight item 34 is a postage satchel and the identifier 32 is a one-dimensional, linear barcode of a conventional type.

The mobile computing device 30 may be of any suitable type and one example which has been found to be particularly suitable is the Zebra TC56 handheld touch computer produced by Zebra Technologies Corporation. This mobile computing device is a rugged industrial design but still has the look and feel of popular pocketable consumer-style smartphones. Similar to a smartphone, the Zebra TC56 comprises a processor, a built-in camera, and a non-transitory, processor-readable storage medium which can contain programming instructions in the form of application software (an App) which, when executed, cause the processor to implement any desired method or function.

An advantage of the Zebra TC56 is that it includes two cameras, one located at the top end of the device and commonly used for scanning barcodes and the like (as shown in FIG. 4), and a second camera located on the rear face (opposite the touchscreen), which can be used for taking photographs in a conventional smartphone manner. However, the camera at the end of the device is also capable of taking images, and it is this capability that is useful in the system of the present invention. Given the dual purpose of this camera, it may also be referred to more broadly as an "imager" rather than a camera.

In one embodiment, not specifically shown in the drawings, the camera may be provided physically separate but functionally connected to the mobile computing device. In one form, the camera may be provided within a wearable barcode scanner of the type which is connectable to a mobile computing device via a wireless connection such as Bluetooth™. These devices are sometimes referred to a "finger scanners", or more commonly "ring scanners". The inventors have found model RS5100 from Zebra Technologies Corp to be particularly suitable, because it includes a trigger button positioned conveniently on the side of the finger on which the device is worn for actuation by the thumb of the same hand, but any alternative ring scanner could be employed. In operation, the ring scanner would be used in the same manner as the integrated camera of the mobile computing device 30 shown in FIGS. 4-7 to capture images of barcodes 18, 118, 32, and QR codes 22, 122, 222.

Alternatively, a conventional smartphone could be used instead of an industrial mobile computing device. In this regard, an App on the smartphone can include program instructions to perform the necessary image capture and processing steps, and thereby form the basis of a system for measuring dimensions of freight items, in combination with a non-electronic measuring apparatus as shown in any of the any one of FIGS. 1 to 3D.

In use, as shown in FIG. 4, pressing a capture button 36 on the mobile computing device 30 (or a trigger button on a ring scanner) will cause the imager/camera to capture the identifier 32 of the satchel 34 which is to be measured, and save this identifier as a record within a memory of the mobile device 30.

Figure 5:
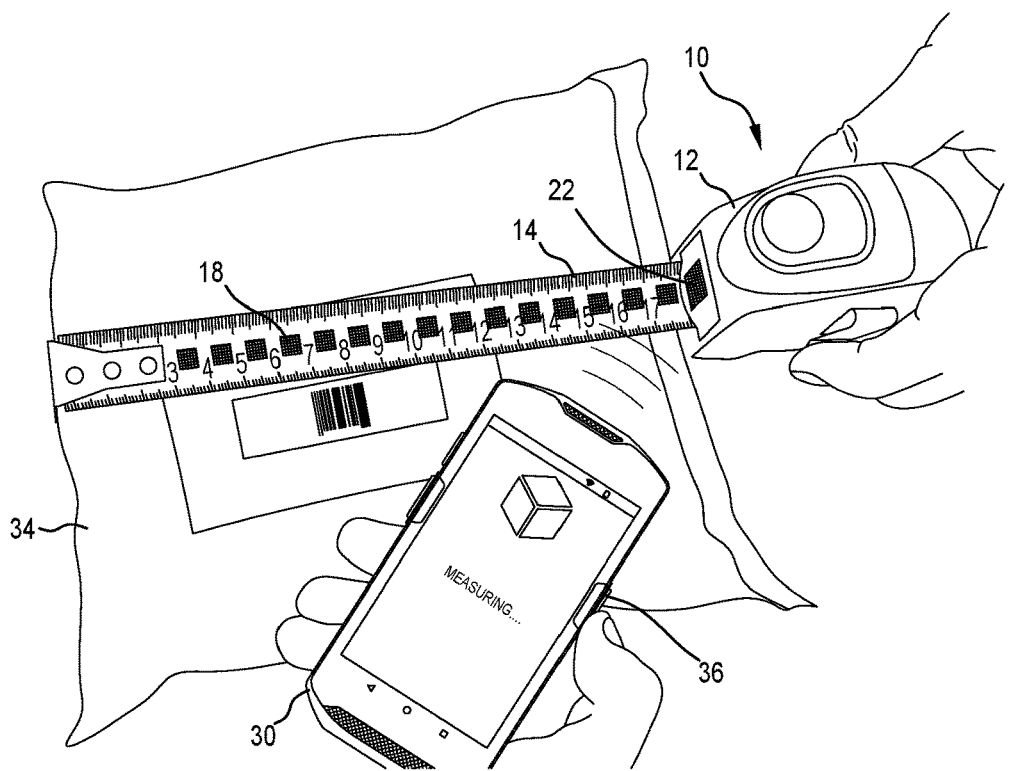
FIG. 5 shows a dimension (the length) of the satchel being measured using the measuring apparatus of FIGS. 1-2 in combination with the mobile computing device.
Figure 6:
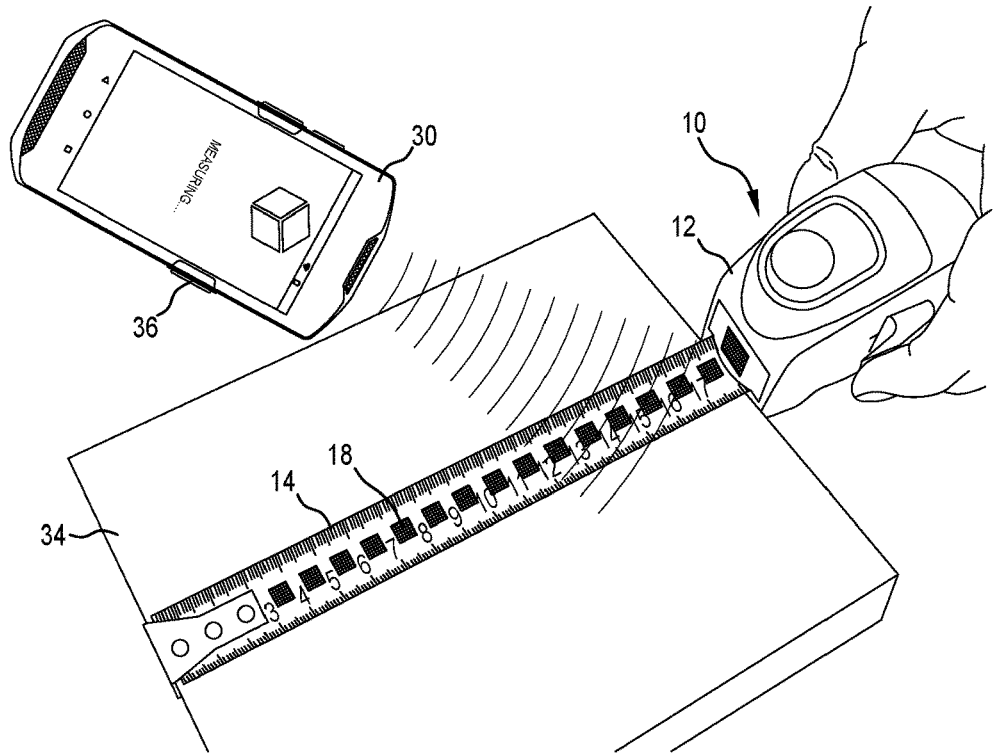
FIG. 6 shows a dimension of another freight item, in this instance a rectangular package, being measured using the measuring apparatus of FIGS. 1-2 in combination with the mobile computing device.

Referring now to FIG. 5, the tape 14 of the measuring apparatus 10 is extended by the user along the length of the satchel 34, and the capture button 36 on the mobile computing device 30 is pressed while the imager/camera is pointed in the vicinity of the junction between the tape 14 and the housing 12. The imager/camera will capture an image of the machine-readable reference symbol 22 together with a visible subset of the sequence of machine-readable codes 18. In the example shown in FIG. 6, the imager/camera is able to "see" a subset of Data Matrix barcodes aligned with the Roman numerals 11 to 17 appearing on the tape 14.

In the alternative embodiments shown in FIGS. 3A to 3D, a similar arrangement exists wherein the rigid ruler 114 shown in FIG. 3A is used either with the sliding pointer 112 shown in FIGS. 3A and 3C, or the glove 212 shown in FIG. 3D. In each instance the imager/camera will capture an image of the machine-readable reference symbol (QR code 122 or 222) together with a visible subset of the sequence of machine-readable codes (barcodes 118) appearing on the ruler 114.

The programming instructions of the App installed on the mobile computing device 30 then analyse the image and identify the reference symbol 22 and each of the codes 18 appearing within the visible subset of codes in the image. Each of the codes 18 within the visible subset is decoded to determine a corresponding length value for each code. The highest value which is visible within the subset of codes is then determined and this highest length value is outputted as a measure of the length of the freight item (the satchel in FIG. 5 or the length of the rectangular package in FIG. 6).

The highest value (being the determined dimension of the freight item) is then displayed on the visual display screen of the mobile computing device 30 and may also be announced audibly via the speaker of the device. The value is also recorded in memory and linked to the item scanned.

The App may also interface with artificial intelligence and machine learning engines to further augment the processing capability of the image capture. In this regard, it is anticipated that the human-readable Roman numerals appearing on a conventional tape measure may be analysed using machine learning techniques such that separate machine-readable codes are not required. In this regard, the human-readable codes also become machine-readable codes.

Figure 7:
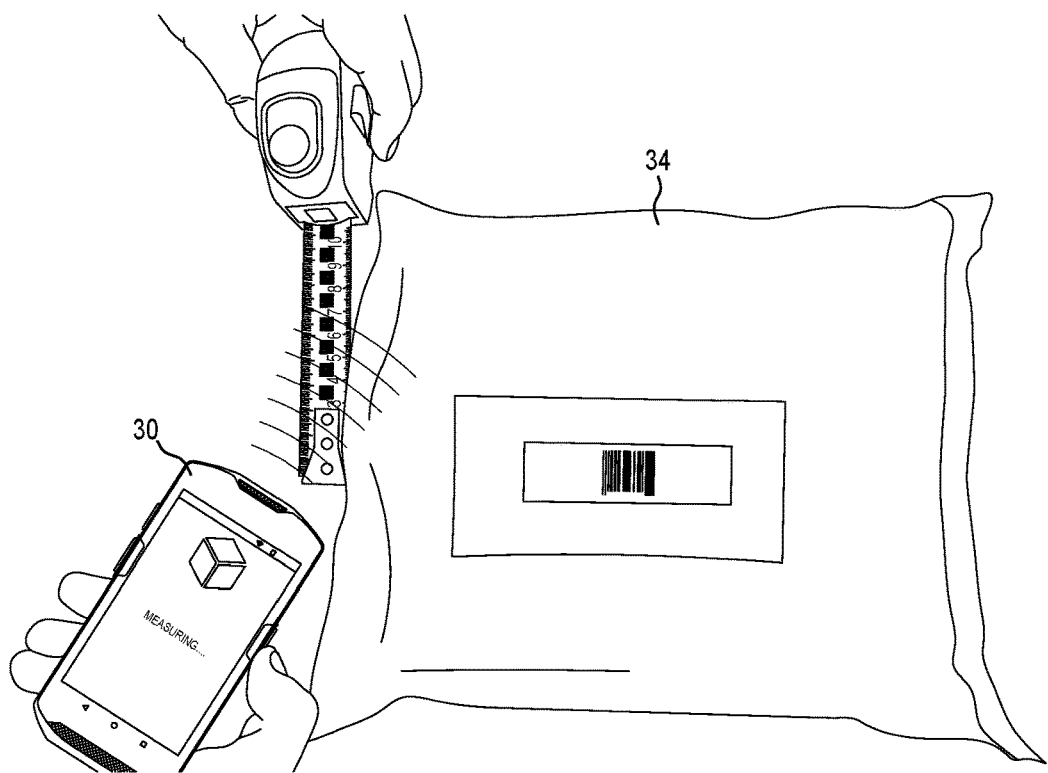
FIG. 7 shows a second dimension (the height) of the satchel being measured using the measuring apparatus in combination with the mobile computing device.

The measurement process is then repeated, as shown in FIG. 7, to capture and analyse additional images corresponding to the width and height of the freight item. Each of the three images is analysed to determine the corresponding highest length value, and thereby determine the length, width and height of the freight item. From this data, the volume of the freight item can then be calculated, and recorded or displayed to the user.

Figure 8:
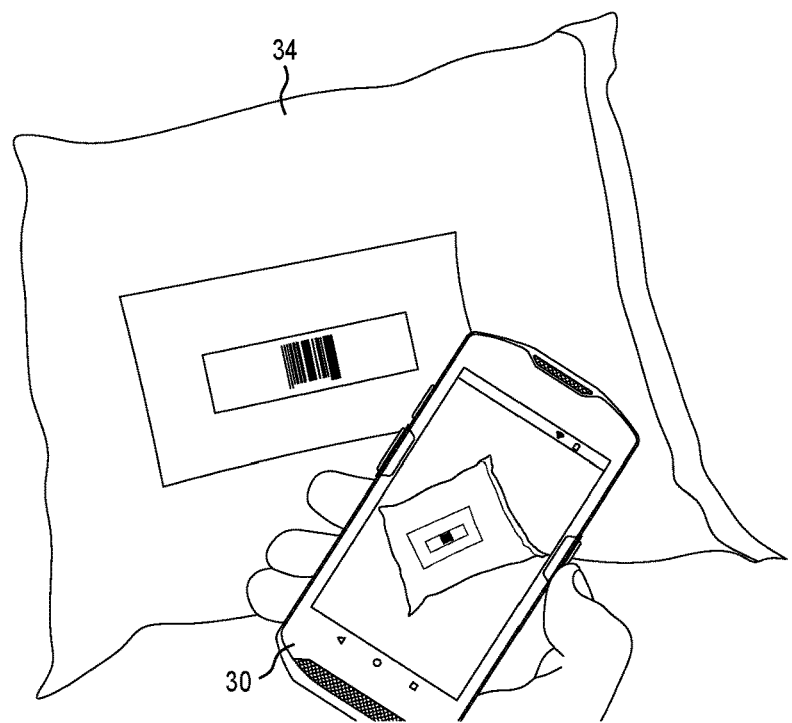
FIG. 8 shows the mobile computing device being used to take an image of the satchel.

In one embodiment, as shown in FIG. 8, the App within the mobile computing device 30 may also include programming instructions enabling the device to capture one or more additional images of the external appearance of the freight item. These images may be recorded together with the identifier and measurements including the dimensions and/or volume of the freight item.

In one embodiment, the freight item dimensions and volume are transmitted to a remote server (via Ethernet, Wi-Fi, cellular mobile network, or any other suitable wireless communication technique) once all measurements for a particular freight item have been completed. However, in alternative embodiments, each individual measurement may be transmitted at the time it is taken. In a further alternative, sets of measurements may be transmitted periodically as batches comprising data for multiple freight items. For example, if there is a communication failure, the mobile computing device may temporarily store data for multiple freight items and then transmit all of this data is a batch to a remote server.

Figure 9:
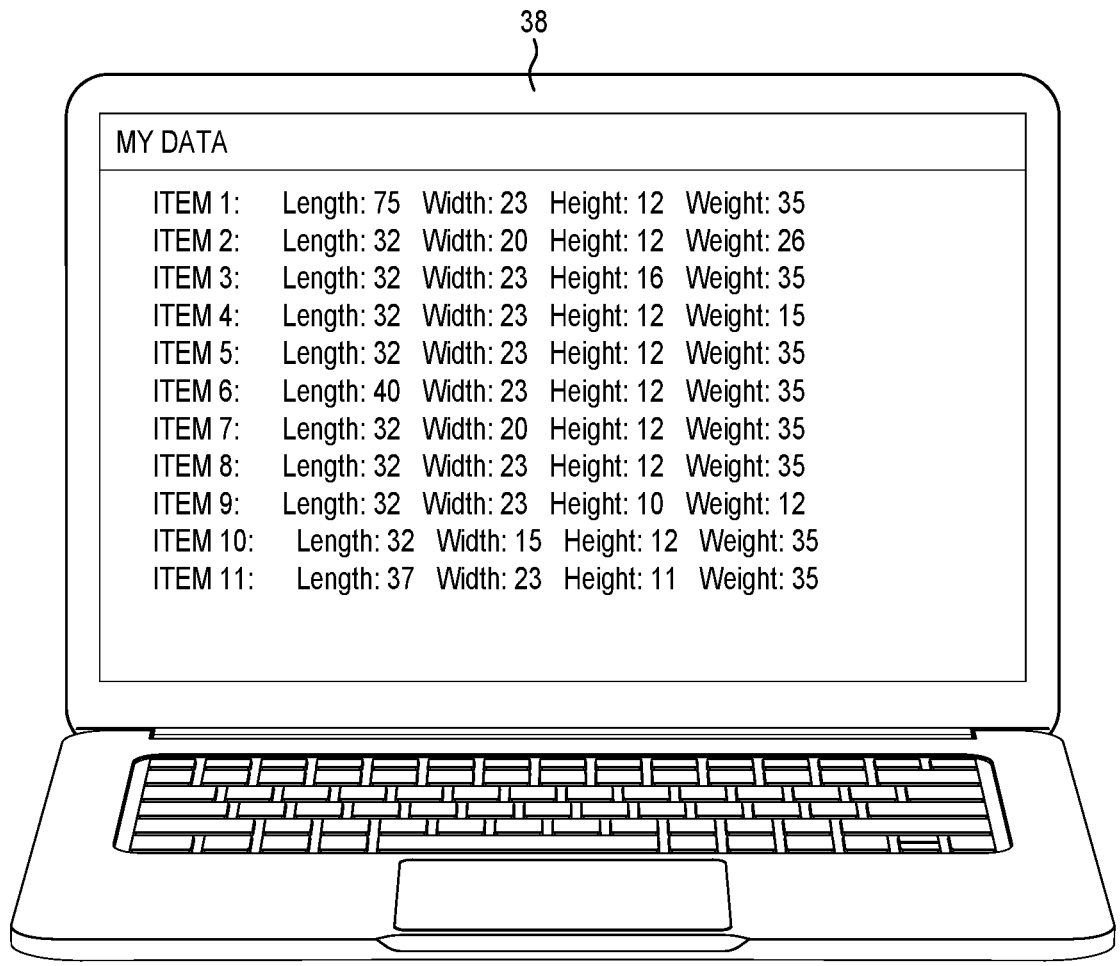
FIG. 9 shows an example of all data having been captured and transmitted to an external server, and then displayed as a report on a web browser interface.

The data may then be assembled as a report 38 displaying all of the relevant measurements and identifiers for all freight items, as shown in FIG. 9.

Figure 10A:
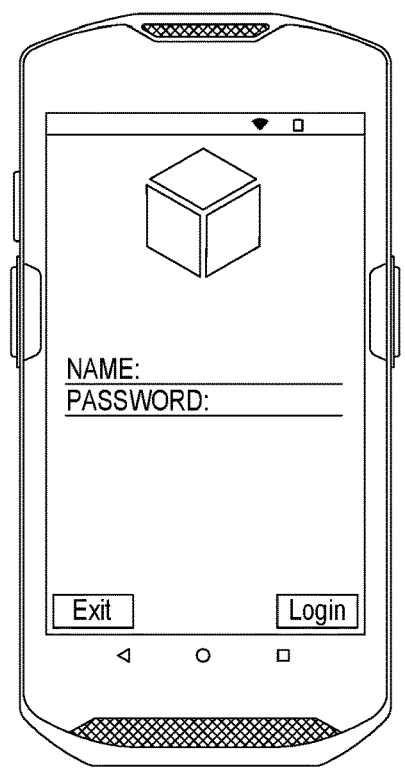
FIGS. 10A-E collectively show an example of a quick reference guide for a user of the system and showing the steps involved in capturing the volumetric data.
Figure 10B:
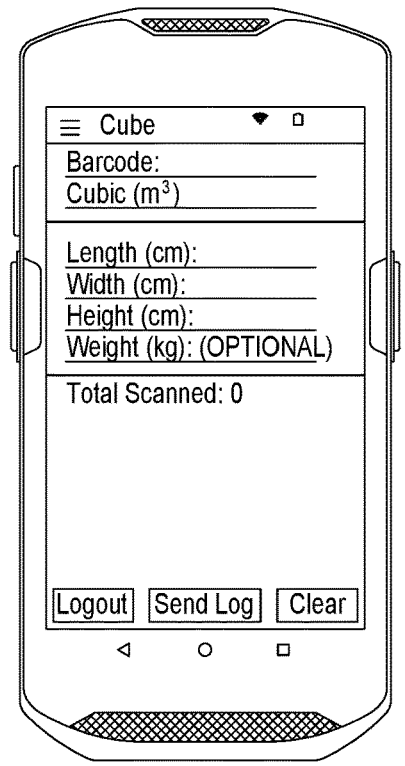
Figure 10C:
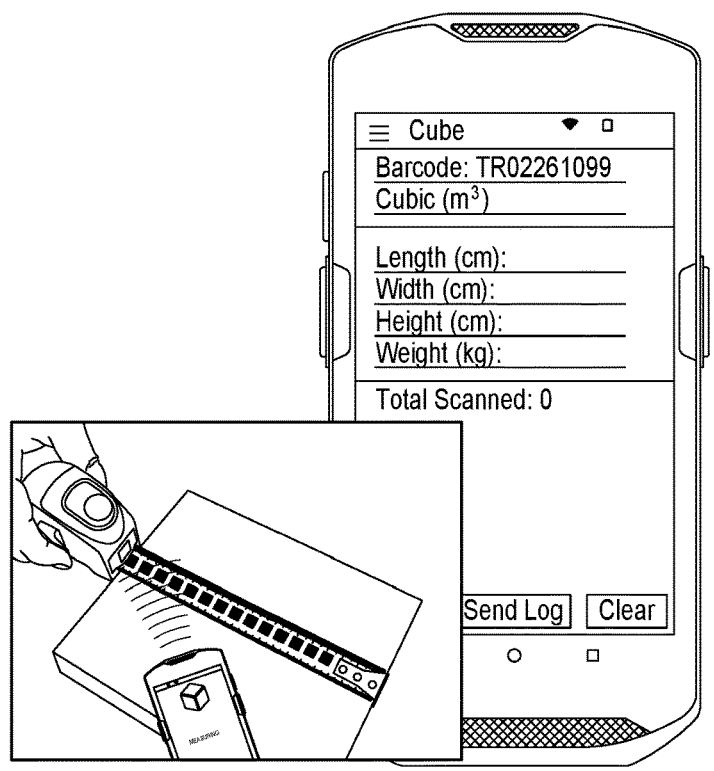
Figure 10D:
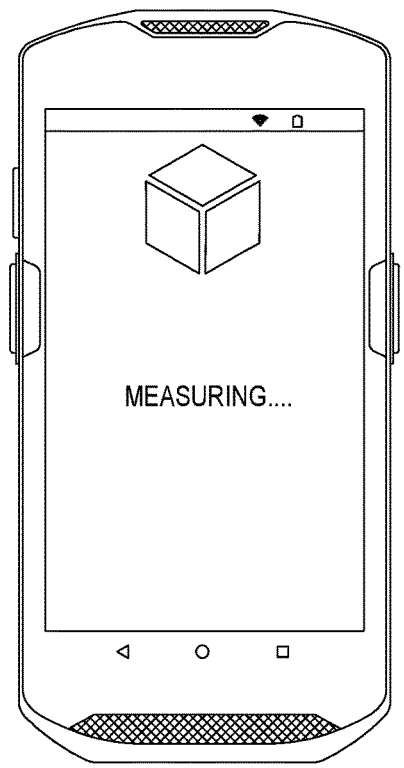
Figure 10E:
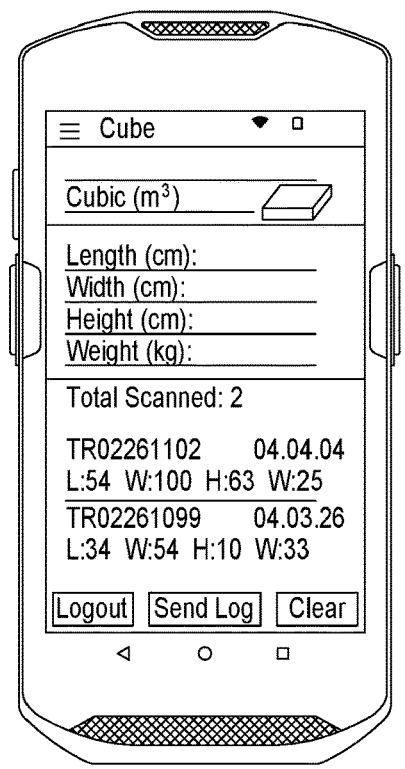

FIGS. 10A to 10E together show a Quick Reference Guide as might be provided to a user of the freight measurement system. Once the user enters his/her credentials (FIG. 10A) they can scan the consignment barcode (FIG. 10B). Once the barcode has been scanned, the user captures three images (FIG. 10C) to determine the length, width and height dimensions of the freight item. Once all three measurements have been taken, the record is saved (FIG. 10D) and displayed on the screen of the mobile computing device (FIG. 10E).

Figure 11:
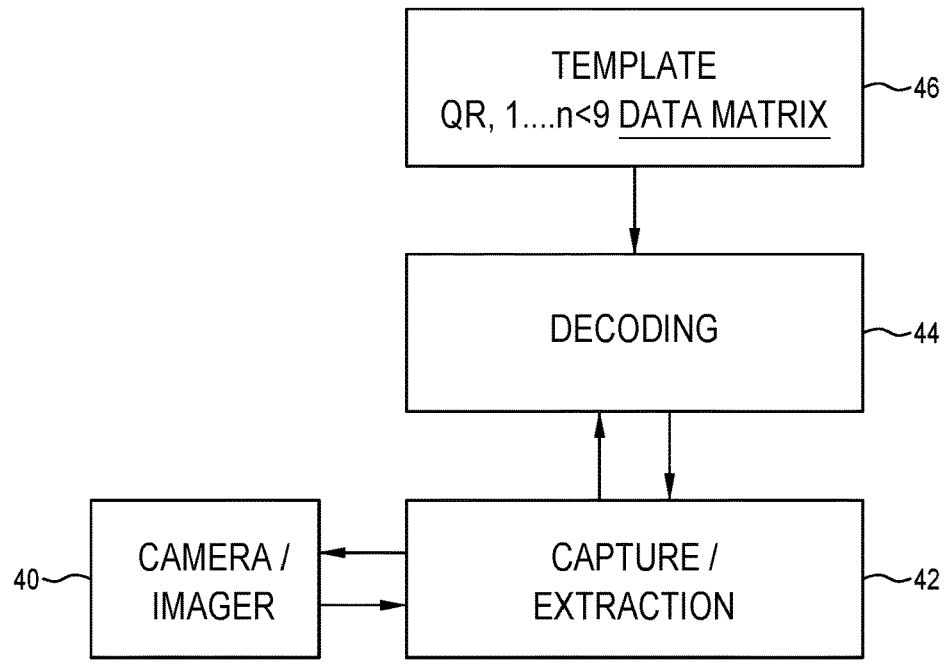
FIG. 11 shows a schematic block diagram of the functional modules involved within the mobile computing device.

FIG. 11 is a schematic block diagram showing functional modules within an App installed on the mobile computing device. The diagram shows a combination of hardware and software modules including a camera/imager 40, a data capture and extraction module 42, a decoding module 44, and data template 46.

The capture/extraction module 42 communicates with the camera/imager 40 to capture an image of the reference symbol 22 and the Data Matrix barcodes 18 appearing within the image. The capture/extraction module 42 then identifies the reference symbol 22 and each of the barcodes 18 of the visible subset of barcodes appearing within the image.

The decoding module 44 then determines a corresponding length value for each barcode 18 and next determines the highest length value of the visible subset of barcodes. To do this, the decoding module 44 utilises a template comprising predefined fields for the reference symbol (QR code) 22 and each of a plurality (1 to n, where n<9) of Data Matrix barcodes 18.

The system of the present invention differs from prior art freight measurement systems in a number of ways, including:
Lower startup and total cost
Mobile
Utilises already existing company assets such as rugged mobile devices and smartphones
Endless system workflows that can be updated in real time
Real time data exchange
Imaging technology that captures imaging area of a manual low cost tape measure
Allows for interchangeable components, i.e. any tape with any mobile device.

The measuring apparatus and system of the preferred embodiments also provide the following advantages:
Low cost, disposable tape measure.
No high cost capital expenditure to deploy No high cost software acquisition
Robust and tamper proof imaging technology that does not rely on an individual mobile device or tape measure set
Ability to augment imaging technology with Artificial Intelligence Technology and Machine Learning at a later stage in the design.
Completely mobile technology and easily accessible to be used in the field, in facilities or places of business.
Re-use of existing mobile assets already in many of target customers business operations.
Downloadable mobile software application for rugged mobile device or smartphone
Realtime communication of data flow from mobile device to backend cloud solution.

Ready to access cloud solution for communication, review and export of data anywhere in the world with no setup through web browser.

Easy to configure workflows, updates, changes via app update or settings in real time.

The principles or concepts that have underlined the described solutions include:

Low cost and disposable measuring tool

Not subject to unreliable close range wireless communications with peripherals and pairing Measuring technique that can produce a reproducible and reliable result consistently A measuring tool that can be in abundance within an organisation and is not tied to a user and can be by their side when required.

A measuring technique that is not subject to wear and tear

Re-use of a rugged mobile device or smartphone that may already be at a users disposal Completely open and configurable software workflows solely in an application operating on the mobile device Realtime communications to a cloud solution to eradicate data loss Verbal messaging to the user to alleviate viewing the mobile device screen Manual data entry where measurement is impractical through the mobile device The end to end solution can be consumed as a service in opex budgets rather than high upfront capex costs.

Although preferred embodiments of the invention have been described herein in detail, it will be understood by those skilled in the art that variations may be made thereto without departing from the spirit of the invention or the scope of the appended claims.

The invention claimed is:

1. An apparatus for measuring a dimension of a freight item, comprising:
    an elongate gauge member having a sequence of machine-readable codes visible along its length, each of the machine-readable codes representing a length value corresponding to a position along the gauge member relative to a reference position; and
    a marker device, movable along the length of the gauge member, for designating a selected position on the gauge member, the marker device comprising a machine-readable reference symbol on an external surface thereof, with the reference symbol being located on the marker device such that in use the reference symbol on the marker device and a subset of the machine-readable codes on the gauge member are simultaneously visible.

2. The apparatus of claim 1 wherein the elongate gauge member comprises a coilable tape and the marker device comprises a housing within which the coilable tape is enclosed,
    wherein the housing comprises a slot through which the tape exists the housing, and
    wherein the machine-readable reference symbol is located adjacent the slot such that, when the tape is extended from the housing through the slot, the reference symbol on the housing and the subset of the machine-readable codes on the tape are simultaneously visible.

3. The apparatus of claim 2 wherein the reference symbol is located adjacent the slot such that, in use, the reference symbol is positioned immediate adjacent a code on the tape having the greatest length value of the sequence of visible codes.

4. The apparatus of claim 1 wherein the elongate gauge member comprises a rigid ruler and the marker device comprises a pointer which is attached to and slidable along the length of the ruler,
    wherein the pointer is configured to enable gripping by a hand of a user and thereby facilitate sliding of the pointer along the ruler, and
    wherein the machine-readable reference symbol is located on the pointer such that the reference symbol and the subset of the machine-readable codes on the ruler are simultaneously visible.

5. The apparatus of claim 1 wherein the elongate gauge member comprises a rigid ruler and the marker device comprises a glove configured to be worn on a hand of a user,
    wherein the machine-readable reference symbol is located on a finger, preferably a thumb, of the glove such that the reference symbol and the subset of the machine-readable codes on the ruler are simultaneously visible when the user grasps the ruler using their gloved hand.

6. An apparatus for measuring a dimension of a freight item, comprising:
    a coilable tape having a sequence of machine-readable codes on a surface thereof, each of the machine-readable codes representing a length value corresponding to a position along the tape relative to a reference position; and
    a housing, within which the coilable tape is enclosed, and comprising:
        a slot through which the tape exits the housing; and
        a machine-readable reference symbol on an external surface of the housing, with the reference symbol being located on the housing such that, when the tape is extended from the housing through the slot, the reference symbol on the housing and a subset of the machine-readable codes on the tape are simultaneously visible.

7. The apparatus of claim 6 wherein the reference symbol is located adjacent the slot such that, in use, the reference symbol is positioned immediate adjacent a code on the tape having the greatest length value of the sequence of visible codes.

8. The apparatus of claim 6 wherein each machine-readable code comprises a barcode.

9. The apparatus of claim 8 wherein each machine-readable barcode comprises a 2D Data Matrix code.

10. The apparatus of claim 6 wherein the machine-readable reference symbol comprises a QR code.

11. A system for measuring dimensions of a freight item comprising:
    a measuring apparatus as defined in claim 1; and
    a mobile computing device comprising a processor, a camera and a non-transitory, processor-readable storage medium, wherein the non-transitory, processor-readable storage medium comprises programming instructions that, when executed, cause the processor to implement a method comprising steps of:
    capturing an image of the measuring apparatus, when the camera is pointed by a user at the measuring apparatus, including within the image the machine-readable reference symbol together with a visible subset of the sequence of machine-readable codes;
    identifying within the image the reference symbol;
    identifying within the image each of the codes within the visible subset;
    decoding each of the codes within the visible subset to determine a corresponding length value for each code;

determining the highest length value of the visible subset of codes; and outputting the highest length value as a measure of a dimension of the freight item.

12. The system of claim 11 wherein the mobile computing device comprises a visual display screen and the outputting step comprises displaying the dimension on the visual display screen.

13. The system of claim 11 wherein the mobile computing device comprises a loudspeaker and the outputting step comprises announcing the dimension via the loudspeaker.

14. The system of claim 11 wherein the mobile computing device comprises a transmitter and the outputting step comprises transmitting the dimension to a remote server.

15. The system of claim 11 wherein the programming instructions cause the processor to implement further steps comprising:

capturing at least three images, one for each of the length, width and height of the freight item;

for each image, repeating the identifying, decoding, determining and outputting steps;

calculating a volume of the freight item; and outputting the calculated volume.

16. The system of claim 11 wherein the programming instructions cause the processor to implement preliminary steps of:

capturing an image of an identifier associated with the freight item; and recording the identifier for output together with the determined dimension(s) and/or volume of the freight item.

17. The system of claim 16 wherein the programming instructions cause the processor to implement further steps of:

capturing at least one additional image of the external appearance of the freight item; and recording the additional image(s) for output together with the identifier and the determined dimension(s) and/or volume of the freight item.

18. A computer program product for use in a system for measuring dimensions of a freight item, the system comprising:

a measuring apparatus as defined in claim 1; and a mobile computing device comprising a processor, a camera and a non-transitory, processor-readable storage medium for storing the computer program product, wherein the computer program product comprises programming instructions that, when executed, cause the processor to implement a method comprising steps of:

capturing an image of the measuring apparatus, when the camera is pointed by a user at the measuring apparatus, including within the image the machine-readable reference symbol together with a visible subset of the sequence of machine-readable codes;

identifying within the image the reference symbol;

identifying within the image each of the codes within the visible subset;

decoding each of the codes within the visible subset to determine a corresponding length value for each code;

determining the highest length value of the visible subset of codes; and outputting the highest length value as a measure of a dimension of the freight item.

19. The apparatus of claim 1 wherein each machine-readable code comprises a barcode.

20. The apparatus of claim 1 wherein the machine-readable reference symbol comprises a QR code.

* * * * *